(12) United States Patent
Shibata

(10) Patent No.: US 6,416,803 B1
(45) Date of Patent: Jul. 9, 2002

(54) METHOD FOR PRODUCING GREEN TEA IN MICROFINE POWDER

(75) Inventor: Toshio Shibata, Shizuoka-ken (JP)

(73) Assignee: Kabushiki Kaisha Kaiken, Shizuoka-Ken (JP)

( * ) Notice: Subject to any disclaimer, the term of this patent is extended or adjusted under 35 U.S.C. 154(b) by 0 days.

(21) Appl. No.: 09/465,534

(22) Filed: Dec. 16, 1999

(51) Int. Cl.$^7$ .................................................. A23F 3/06
(52) U.S. Cl. ....................................... 426/241; 426/597
(58) Field of Search ............................... 426/597, 474, 426/478, 433, 434, 435, 241

(56) References Cited

FOREIGN PATENT DOCUMENTS

| JP | 57231784 | * | 12/1982 |
|----|----------|---|---------|
| JP | 07068740 | * | 9/1986 |
| JP | 530907 | | 2/1993 |
| JP | 03355880 | * | 7/1993 |
| JP | 04146754 | * | 12/1993 |
| JP | 6141775 | | 5/1994 |
| JP | 796207 | | 4/1995 |
| JP | 7107915 | | 4/1995 |
| JP | 8256689 | | 10/1996 |
| JP | 9275903 | | 10/1997 |
| JP | 1156243 | | 3/1999 |

OTHER PUBLICATIONS

Anon, Maccah, http://www1.odn.ne.jp/~cas30550/cha-noyu–e/mattua–e.html.*

Shohokuen, How Maccha is made., http://www.ujicha.com/shouhokuen%20pages/english/e–santi3.html.*

Norio et al., Firing process of Tea by Far–Infrared Radiation., Chagyo Kenkyu Hokoku, No. 68, 1998 abstract only.*

Tadakuzu, et al., Merits and Demerits of Intial Firing By Far Infrared Radiation for Green Tea., Chagyo Kenkyu, No. 87, 1998 abstract only.*

Jacobs, The Chemistry and Technology of Food and Food Products., vol. 1, Interscience Publishers., 1944, p. 861–869.*

Caltech., What Is Infrared., http://ipac.caltech.edu/Outreach/Edu/infrared.html.*

* cited by examiner

Primary Examiner—Arthur L. Corbin
(74) Attorney, Agent, or Firm—Price and Gess

(57) ABSTRACT

Crude green tea is pulverized with a ball mill to screen a microfine powder of 1 micron or less with a sieve. The screened green tea microfine powder is spread in a flat box, on which distilled water is sprayed to a final moisture content of 7.5 to 8.0%, followed by agitation. The flat box is arranged in an infrared irradiation chamber, where the green tea microfine powder is heated with infrared rays at a temperature of 40° C. to 60° C. for 130 minutes to 180 minutes. In such manner, the microfine powder with a high ratio of nutrient digestion and absorption and with high active oxygen-eliminating potency due to SOD contained therein can be provided, together with a method for producing the same.

8 Claims, 2 Drawing Sheets

METHOD FOR PRODUCING GREEN TEA IN MICROFINE POWDER

BACKGROUND OF THE INVENTION

1. Field of the Invention

This invention relates to powdery green tea prepared by pulverizing crude green tea; more specifically, the invention relates to a method for producing green tea in a microfine powder, comprising a modified pulverizing process and modified processes thereafter, and green tea in a microfine powder as prepared by the method.

2. Description of the Related art

Green tea contains enormous amounts of nutrients, such as vitamins E, C and A, catechin and theanine. It has been said in recent years that active oxygen is one of the factors affecting disadvantageously human health and promoting aging. Meanwhile, green tea contains a higher content of superoxide dismutase (SOD) as an enzyme eliminating active oxygen. SOD was discovered in 1969 by J. M. McCord and I. Fridovich. In Modern Medicine, Vol. 28, No. 8, 1996, SOD is presented to function as a preventive system against oxidative damage.

Hence, not only green tea drinking in general fashion but also the intake of green tea per se has been recommended; for example, powdery green tea prepared by pulverizing dried crude green tea with a grinder or the like has been developed. Herein, crude green tea is prepared by steaming fresh green tea leaves and subjecting the resulting green tea leaves to processes for coarse rubbing, rubbing and twisting, moderate rubbing and fine rubbing.

The particles of general powdery green tea and pulverized green tea are at about 3 to 10 microns. Therefore, nutrients therein cannot effectively be absorbed even if these types of green tea are ingested directly as they are. Additionally, the SOD potency of eliminating active oxygen is sometimes lost in the process of green tea preparation.

SUMMARY OF THE INVENTION

This invention has been proposed to overcome the problems of the conventional art. It is an object of the invention to provide green tea in a microfine powder at a high ratio of nutrient digestion and absorption and with high active oxygen-eliminating potency of SOD contained in the green tea.

So as to attain the above object, the method for preparing green tea in a microfine powder in accordance with the invention comprises pulverizing crude green tea into a microfine powder, spraying water to the resulting microfine powder and agitating the powder, and heating the microfine powder with infrared rays.

According to the method for preparing green tea in a microfine powder as described above, heating with an infrared ray after the preparation of the microfine powder can increase the ratio of nutrient digestion and absorption and can enhance the SOD potency to eliminate active oxygen.

Preferably, the inventive method for preparing green tea in a microfine powder comprises pulverizing crude green tea into a microfine powder of 1 micron or less, spraying water to the resulting microfine powder to a final moisture content of 6 to 8% and agitating the powder, and heating the microfine powder with infrared ray at a temperature of 40° C. to 65° C. for 130 minutes to 180 minutes.

The inventive green tea in such microfine powder is prepared by pulverizing crude green tea into a microfine powder of 1 micron or less and the green tea exerts active oxygen-eliminating potency of $0.7 \times 10^5$ to $1.8 \times 10^5$ per 1g of the green tea due to superoxide dismutase contained therein.

According to the method for preparing green tea in a microfine powder and owing to the resulting green tea in such microfine powder, the ratio of nutrient digestion and absorption can be improved profoundly by preparing the green tea in a microfine powder at 1 micron or less, while the steaming process under the above conditions can enhance the SOD potency to eliminate active oxygen by several tens-fold that of general green tea of middle grade.

DESCRIPTION OF PREFERRED EMBODIMENTS

The invention will now be described in the following embodiments with reference to FIGS. 1 and 2.

[1. Preparation Process]

Figure 1:
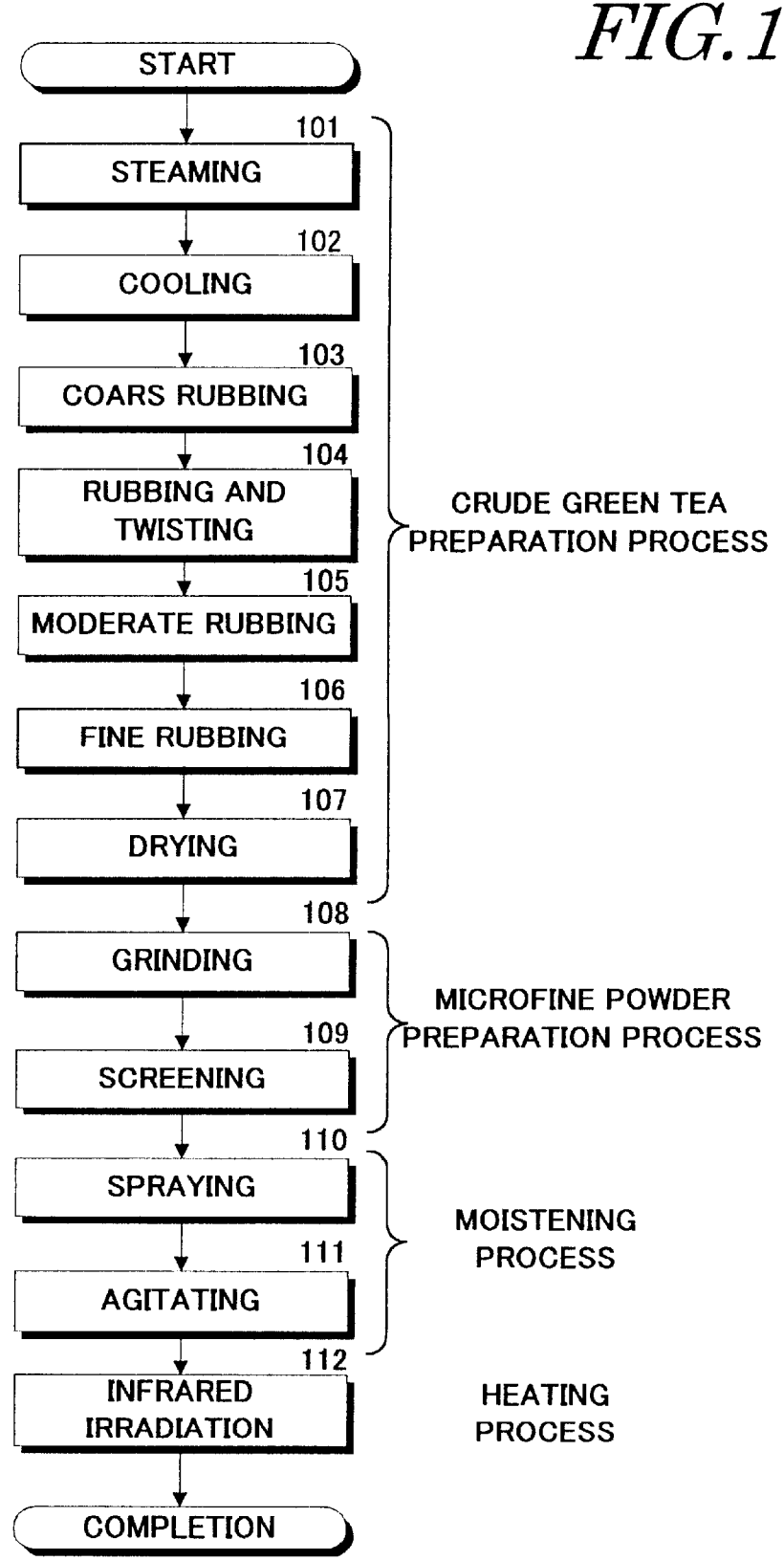
FIG. 1 is a flow chart of the processes of the embodiment of the invention.

The processes of preparing green tea in a microfine powder are now described in the present embodiment with reference to the flow chart in FIG. 1.

[1-1. Crude Green Tea Preparation Process]

By first steaming picked fresh green tea leaves with a steamer, active enzymes in the tea leaves are inactivated so as to permit the tea leaves to retain the green color for a long time (step 101). The steaming temperature is appropriately 90° C. or less for up to 30 seconds. The steamed tea leaves are cooled with a cooler, to remove excess water (step 102). After cooling, the tea leaves are placed in a machine for coarse rubbing, where the tea leaves are rubbed together under pressure and with friction while the tea leaves are heated and dried in hot air (step 103). After the termination of the coarse rubbing process, the tea leaves are treated with a rubbing/twisting machine, with which the tea leaves are pressurized while the tea leaves are rotated gradually in a mass state, so that the individual tea leaves are at a uniform moisture content of while the tissues thereof are softened and degraded appropriately (step 104).

The green tea leaves rubbed together with the machine for twisting and rubbing are then placed in a machine for moderate rubbing, where the tea leaves turn into a twisting shape under rotation while the water oozed out from the inner structure of the tea leaves is dried up in hot air, to form a prototype of green tea of middle grade (step 105). The tea leaves dried at some extent and taken out of the machine for moderate rubbing are placed in a machine for fine rubbing, where the tea leaves are rubbed together and more elongated with indirect heating, so that the resulting tea leaves are molded in the form of green tea for middle grade (step 106). The green tea leaves taken out of the machine for fine rubbing are at a moisture content of 11% to 13%; then, the green tea leaves are dried with a drier to a final moisture content of about 4% to 5% (step 107). The drying temperature is appropriately about 66° C.

[1-2. Microfine Powder Preparation Process]

The crude green tea thus prepared is then pulverized with a ball mill (step 108). The ball mill is for example of a configuration such that multiple cylindrical tubes are arranged on a rotation article capable of rotation with a driving force of motor; and numerous ceramic balls are then placed in each of the cylindrical tubes. The crude green tea is placed inside the cylindrical tubes and mounted on the rotation article; by driving the motor, the crude green tea is pulverized with the ceramic balls inside the cylindrical tubes under rotation. The pulverized crude green tea is subsequently sieved with a sieve of a flywheel type, to screen green tea in a microfine powder of 1 micron or less (step 109).

[1-3. Moistening Process]

As has been described above, the moisture content in the crude green tea in such microfine powder is 3.4 to 3.8%. The microfine powder is then placed in a flat box with an upper opening. By spraying distilled water on the microfine powder in the box and then agitating the powder, the powder is kept at a moisture content of 7.5 to 8% (steps 110, 111).

[1-4. Heating Process]

Figure 2:
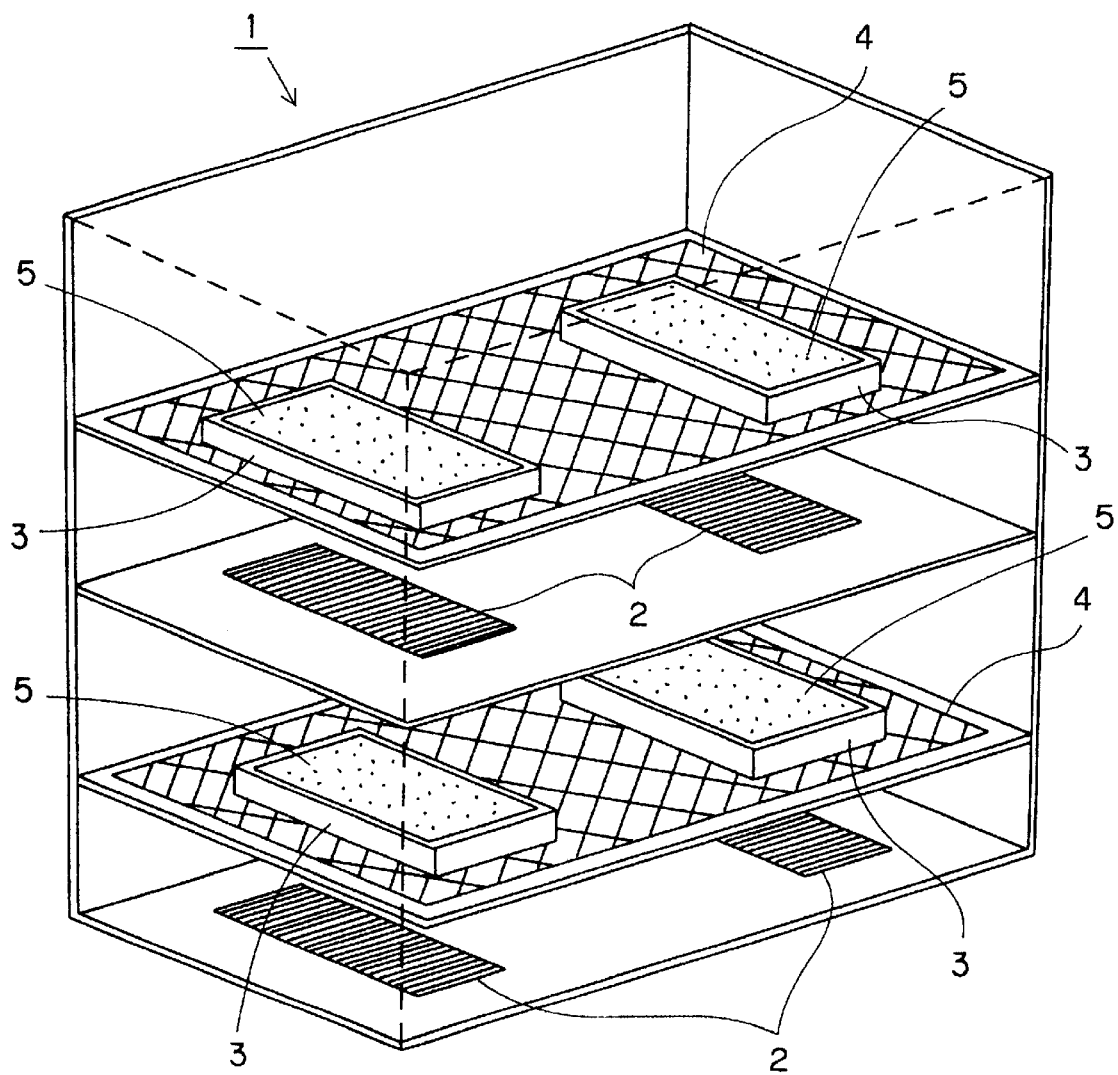
FIG. 2 is a perspective view of the infrared irradiation chamber of the embodiment of FIG. 1.

The green tea in the microfine powder is heated in infrared irradiation chamber 1 as shown in FIG. 2. In the infrared irradiation chamber 1, infrared exothermic body 2 is arranged at multiple steps, while net shelf 4 to arrange box 3 to be heated is mounted above the exothermic body 2 on each step. After arranging the box 3 containing the microfine powder green tea 5 on such net shelf 4, infrared ray from the exothermic body 2 irradiates the green tea to steam the green tea between 40° C. and 65° C. for 130 minutes to 180 minutes (step 112). Most preferably, the temperature and time period are preferably 46° C. to 60° C. for 180 minutes.

By the above processes, the microfine powder green tea with the active oxygen-eliminating potency of about $1.2 \times 10^5$ to $1.5 \times 10^5$ can be produced.

Furthermore, the room which the infrared irradiation chamber 1 is placed in should be ventilated because the inside of the room is covered with the microfine powder of green tea; however, fresh air influx possibly influences the resulting product due to the temperature and humidity, so the moisture given to the powder, the infrared irradiation temperature and the steaming time should be adjusted, depending on the time of a day, the season and the like. For example, the moisture of the microfine powder green tea prior to heating may be adjusted within 6% to 8%.

[2. Advantages of the Embodiment]

In the embodiment described above, green tea in such microfine powder with active oxygen-eliminating potency of $1.2 \times 10^5$ to $1.5 \times 10^5$ per 1g can be produced. The active oxygen-eliminating potency of the resulting microfine powder green tea is about 50- to 60-fold that of general green tea of middle grade, which is at about $2.5 \times 10^3$ per 1 g.

Because the particles of the microfine powder green tea are at 1 micron or less, the microfine powder green tea can procure an improved ratio of nutrient digestion and absorption, compared with general powdery green tea of about 3 to 10 microns.

[3. Other Embodiments]

The invention is not limited to the embodiment. The process for producing crude green tea is one of general processes and is illustrated just by way of example but not for limiting. The apparatus for pulverization, the sieve for screening and the infrared irradiation chamber in the above description are just for illustration, not for limiting.

By preparing crude green tea into a powder below 1 micron with a grinder, the screening process can be omitted. The powdery particle is at a size of 1 micron or less. A powder particle at 0.5 to 0.3 micron can be absorbed more highly.

The active oxygen-eliminating potency per 1 g of the resulting green tea in the microfine powder possibly varies between about $0.7 \times 10^5$ and about $2.0 \times 10^5$, depending on the moisture content and the heating temperature and steaming time for infrared heating, and the season of picking up the raw material green tea leaves. Between the values, the resulting active oxygen-eliminating potency is far more enhanced than general green tea of middle grade. For yielding such active oxygen-eliminating potency, therefore, the moisture content and the heating temperature and steaming time for infrared heating can be modified within the numerical range or can be modified outside the range, depending on the time of a day, the season for tea preparation, and the season for picking up green tea leaves.

EXAMPLES

[1. Superoxide-Eliminating Activities]

Superoxide-eliminating activities of the inventive examples and general green tea of middle grade were assayed by ESR (electron spin resonance) at Foundation Nippon Food Analysis Center. The results are shown below. The activities are shown in the unit defined by J. M. McCord and I. Fridovich [J. Biol. Chem., 244, 6049 (1969)] per 1 g·green tea. The invention is not limited to these specific examples.

[1-1. Inventive Examples]

The superoxide-eliminating potency of each of the examples at variable infrared steaming temperatures is as follows. Herein, the heating time is 150 minutes for all the cases.

(1). Superoxide-eliminating potency of $1.4 \times 10^5$ at a temperature of 40° C. to 48° C.

(2). Superoxide-eliminating potency of $1.5 \times 10^5$ at a temperature of 48° C. to 55° C.

(3). Superoxide-eliminating potency of $1.5 \times 10^5$ at a temperature of 55° C. to 62° C.

(4). Superoxide-eliminating potency of $1.5 \times 10^5$ at a temperature of 62° C. to 65° C.

[1-2. General Green Tea of Middle Grade]

A sample (6 g) of general green tea of middle grade was immersed in 170 ml of water at 70° C. and was then left to stand at ambient temperature for 2 minutes, followed by filtration; the resulting filtrate was subjected to the same test as described above. The superoxide-eliminating potency was at a value of $2.5 \times 10^3$.

[2. Nutrient]

Nutrient of the inventive example, crude green tea and general green tea of middle grade were assayed at Foundation Nippon Food Analysis Center. The results of analytical test are shown below. The invention is not limited to these specific examples.

[2-1. Inventive example]

| Subject for analysis | Results | Detection limit | Note | Analytical method |
|---|---|---|---|---|
| Dietary fiber | 26.9 g/100 g | | | Enzyme-weight method |
| Anhydrous caffeine | 2.3 g/100 g | | | HPLC (high precision liquid chromatography) |
| Tannin | 13.0 g/100 g | | 1 | |
| Iron | 7.27 mg/100 g | | | o-phenanthroline absorptiometry |
| Calcium | 224 mg/100 g | | | Potassium permanganate volumetric analysis |
| Zinc | 2.50 mg/100 g | | | Atomic absorptiometry |
| Manganese | 57.6 mg/100 g | | | Atomic absorptiometry |
| Total carotene | 25.2 mg/100 g | | | HPLC |
| Effective vitamin A (corrected on basis of total carotene) | 14,000 IU/100 g | | | HPLC |
| Total ascorbic acid (total Vitamin C) | 403 mg/100 g | | 2 | HPLC |
| Total Tocopherol | 36.1 mg/100 g | | | HPLC |
| $\alpha$-tocopherol | 31.7 mg/100 g | | | |
| $\beta$-tocopherol | 0.2 mg/100 g | | | |
| $\tau$-tocopherol | 4.0 mg/100 g | | | |
| $\delta$-tocopherol | 0.2 mg/100 g | | | |
| Theanine | 1.04 mg/100 g | | | Amino acid Automatic analysis |
| Total Chlorophyll | 441 mg/100 g | | | absorptiometry (visual) |

Manufacturer: name: MIRYOKUEN IKUMI CHA Agricultural Cooperative Union
Address: 1800-1, Ikumi, Shimada-shi, Shizuoka-ken.
Note 1: Official Method for Green Tea Analysis, defined by the Green Tea
Note 2: Total ascorbic acid was assayed in the form of a hydrazine derivative

[2-2. Crude green tea]

| Subject For analysis | Results | Detection limit | Note | Analytical method |
|---|---|---|---|---|
| Anhydrous caffeine | 2.2 g/100 g | | | HPLC |
| Tannin | 13.4 g/100 g | | 1 | |
| Iron | 6.30 mg/100 g | | | o-phenanthroline absorptiometry |
| Zinc | 2.51 mg/100 g | | | atomic absorptiometry |
| Manganese | 60.6 mg/100 g | | | atomic absorptiometry |
| Total carotene | 21.2 mg/100 g | | | HPLC |
| Effective vitamin A (corrected on basis of total carotene) | 11,800 IU/100 g | | | HPLC |
| Total ascorbic acid (total Vitamin C) | 362 mg/100 g | | 2 | HPLC |
| Total Tocopherol | 30.3 mg/100 g | | | HPLC |
| $\alpha$-tocopherol | 26.7 mg/100 g | | | |
| $\beta$-tocopherol | 0.3 mg/100 g | | | |
| $\tau$-tocopherol | 3.3 mg/100 g | | | |
| $\delta$-tocopherol | not found | 0.1 mg/100 g | | |
| Theanine | 1.03 mg/100 g | | | Amino acid Automatic analysis |

Manufacturer: name: MIRYOKUEN IKUMI CHA Agricultural Cooperative Union
Note 1: Official Method for Green Tea Analysis, defined by the Green Tea
Note 2: Total ascorbic acid was assayed in the form of a hydrazine derivative

[2-3. General green tea of middle grade]

| Subject For analysis | Results | Detection limit | Note | Analytical method |
|---|---|---|---|---|
| Anhydrous caffeine | 2.1 g/100 g | | | HPLC (high Precision liquid Chromatography) |
| Tannin | 12.6 g/100 g | | 1 | |
| Iron | 6.97 mg/100 g | | | o-phenanthroline absorptiometry |
| Zinc | 2.46 mg/100 g | | | Atomic absorptiometry |
| Manganese | 50.4 mg/100 g | | | Atomic absorptiometry |
| Total carotene | 11.9 mg/100 g | | | HPLC |
| Effective vitamin A (corrected on basis of total carotene) | 6,610 IU/100 g | | | HPLC |
| Total ascorbic acid (total Vitamin C) | 173 mg/100 g | | 2 | HPLC |
| Total Tocopherol | 22.5 mg/100 g | | | HPLC |
| $\alpha$-tocopherol | 19.2 mg/100 g | | | |
| $\beta$-tocopherol | 0.2 mg/100 g | | | |
| $\tau$-tocopherol | 3.0 mg/100 g | | | |
| $\delta$-tocopherol | 0.1 mg/100 g | | | |
| Theanine | 1.64 mg/100 g | | | Amino acid Automatic analysis |

Manufacturer: name: KANWU CRA Agricultural Cooperative Union
Address: 2139, Kanza, Shimada-shi, Shizuoka-ken.
Note 1: Official Method for Green Tea Analysis, defined by the Green Tea
Note 2: Total ascorbic acid was assayed in the form of a hydrazine derivative As has been described above, the invention can provide green tea in a microfine powder at a high ratio of nutrient absorption and digestion and with high active oxygen-eliminating potency due to SOD contained therein, together with a method for producing the same.

What is claimed is:

1. A method for preparing green tea in a microfine powder, comprising pulverizing crude green tea into a microfine powder, spraying water on the resulting microfine powder and agitating the powder, and heating the microfine powder with infrared rays to produce an enhanced superoxide dimutose content and to provide a range of active oxygen-eliminating potency of approximately $0.7 \times 10^5$ to $2 \times 1$ per gram of microfine powdered green tea leaves.

2. A method for preparing green tea in a microfine powder, comprising pulverizing crude green tea into a microfine powder of 1 micron or less, spraying water on the resulting microfine powder to provide a final moisture content of 6 to 8% and agitating the powder, and heating the microfine powder with infrared rays at a temperature of 40° C. to 65° C. for 130 minutes to 180 minutes to produce an enhanced superior dimutose content and to provide a range of active oxygen-eliminating potency of approximately $0.7 \times 10^5$ to $2 \times 10^5$ per gram of microfine powdered green tea leaves.

3. A method of preparing powdered green tea to have an enhanced superoxide dismutase content, comprising:

pulverizing green tea leaves to form a powder of 1 micron or less in size;

maintaining a moisture content by weight of approximately 6% to 8% for the powder and irradiating the powder with infrared rays to steam the powder sufficiently produce an enhanced superoxide dimutose content and to provide a range of active oxygen-eliminating potency of approximately $0.7 \times 10^5$ to $2 \times 1 O)$ per gram of powdered green tea leaves.

4. The method of claim 3, wherein the green tea leaves are pulverized to a powder particle size range of 0.5 to 0.3 microns.

5. The method of claim 3, wherein the moisture content is maintained by spraying water on the powder and agitating the powder to provide the powder with approximately double the initial moisture content prior to the irradiating step.

6. The method of claim 3, wherein the powder is irradiated with infrared rays for a time period of 130 minutes to 180 minutes at a temperature within a range of 40° C. to 65° C.

7. The method of claim 6, wherein the moisture content is maintained by spraying water on the powder and agitating the powder to approximately double the initial moisture content prior to the irradiating step.

8. The method of claim 7, wherein the green tea leaves are pulverized to a powder particle size range of 0.5 to 0.3 microns.

* * * * *